United States Patent
Gumbrich et al.

(10) Patent No.: US 7,874,621 B2
(45) Date of Patent: Jan. 25, 2011

(54) SEAT-DEPTH ADJUSTABLE VEHICLE SEAT WITH A FIRST SEAT PART AND A SECOND SEAT PART

(75) Inventors: Markus Gumbrich, Solingen (DE); Stefan Gebauer, Solingen (DE); Nils Magnus, Remscheid (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 157 days.

(21) Appl. No.: 12/334,515

(22) Filed: Dec. 14, 2008

(65) Prior Publication Data

US 2009/0152920 A1 Jun. 18, 2009

(30) Foreign Application Priority Data

Dec. 14, 2007 (DE) .................. 10 2007 060 926

(51) Int. Cl.
*B60N 2/00* (2006.01)
(52) U.S. Cl. .................. 297/337; 297/311; 297/284.11
(58) Field of Classification Search ................. 297/311, 297/312, 337, 284.11, 384.3
See application file for complete search history.

(56) References Cited

U.S. PATENT DOCUMENTS

| | | | | |
|---|---|---|---|---|
| 4,636,002 A * | 1/1987 | Genjiro | ...................... | 297/319 |
| 6,095,606 A * | 8/2000 | Opsvik | ........................ | 297/340 |
| 6,260,922 B1 * | 7/2001 | Frohnhaus et al. | .......... | 297/330 |
| 6,302,482 B1 * | 10/2001 | Moll et al. | .................. | 297/340 |
| 6,454,353 B1 * | 9/2002 | Knaus | ..................... | 297/284.11 |
| 6,601,918 B2 * | 8/2003 | Mattsson | ................ | 297/284.11 |
| 7,614,693 B2 * | 11/2009 | Ito | ......................... | 297/284.11 |
| 7,669,929 B2 * | 3/2010 | Simon et al. | ............ | 297/284.11 |
| 2009/0033134 A1 * | 2/2009 | Hofmann et al. | ............ | 297/311 |

FOREIGN PATENT DOCUMENTS

| | | |
|---|---|---|
| DE | 1 755 740 A1 | 6/1968 |
| DE | 19 628 381 A1 | 1/1998 |
| DE | 198 15 283 A1 | 10/1999 |
| DE | 199 13 503 A1 | 9/2000 |
| DE | 199 55 296 C1 | 2/2001 |
| DE | 103 53 245 A1 | 6/2005 |
| DE | 698 27 303 T2 | 2/2006 |
| DE | 10 2005 028 620 A1 | 12/2006 |
| WO | WO 03/068551 A1 | 8/2003 |

\* cited by examiner

*Primary Examiner*—Laurie K Cranmer
(74) *Attorney, Agent, or Firm*—McCarter & English, LLP

(57) ABSTRACT

The seat depth adjustable motor vehicle seat comprises a first seat part, a second seat part and a longitudinal adjustment device interposed between the first seat part and the second seat part and allowing for displacement movement in a first seat direction of the first seat part relative to the second seat part. The seat further comprises a toothed rack connected to the second seat part and extending substantially in the first seat direction. A primary gear meshes with the toothed rack. A secondary gear is in rotating communication with the primary gear. A toothed bar extends substantially in a second seat direction and engages the secondary gear. A third seat part is slidably disposed in the second seat direction and is connected to the toothed bar.

11 Claims, 3 Drawing Sheets

SEAT-DEPTH ADJUSTABLE VEHICLE SEAT WITH A FIRST SEAT PART AND A SECOND SEAT PART

CROSS-REFERENCE TO RELATED APPLICATIONS

This application claims priority to German Application No. DE 10 2007 060 926.6, filed Dec. 14, 2007, which is hereby incorporated by reference in its entirety as part of the present disclosure.

BACKGROUND OF THE INVENTION

The invention relates to a seat depth adjustable motor vehicle seat as set forth in the preamble of patent claim 1. Such a motor vehicle seat is known from DE 19 628 381 A1. Further, there is known from DE 698 27 303 T2 a vehicle seat the seat depth of which is adjustable, a second seat part thereof, which is a front seat part, being adjustable relative to a first, rear seat part by means of an electric motor. On the vehicle seat previously known from DE 199 13 503 A1, which can be positioned different distances apart by means of an adjustment device. A similar vehicle seat is also shown in DE 199 55 296 C1.

A problem with the seat depth adjustment devices of the seat part is that the padding must somehow follow or be compensated on the one side, meaning it must conform to the length variations; on the other side however, the cover of the padding must also be configured accordingly. The padding should have the same quality everywhere, irrespective of the seat depth adjustment. Additionally, it is desired that the least possible crinkles occur in the cover and that there are as few gaps as possible, be they covered or not.

In view of the vehicle seat of the type mentioned herein above, it is the object of the invention to further develop the previously known vehicle seat in such a manner that the seat part be adjustable in the direction so as to allow for a more favorable configuration of the padding, in particular also of the cover, than before.

SUMMARY OF THE INVENTION

In view of the seat depth adjustable motor vehicle seat of the type mentioned herein above, the solution to this object is that a toothed rack extending substantially in the first seat direction is connected to the second seat part, that there is provided a primary gear meshing with the toothed rack, that there is provided a secondary gear in rotating communication with the primary gear, that there is provided a toothed bar extending substantially in a second seat direction and engaging the secondary gear and that there is provided a third seat part that is slidably disposed in the second seat direction and that is connected to the toothed bar.

On this motor vehicle seat, the motor drive responsible and provided for longitudinal adjustment between the first seat part and the second seat part is indirectly used at the same time for the drive between the second seat part and a third seat part. This is achieved by the fact that there are provided a primary gear and a toothed rack cooperating therewith, which are being moved with respect to each other by the longitudinal adjustment. Accordingly, the linear movement is converted back into a movement of rotation. This movement of rotation is then advantageously transmitted to the secondary gear which meshes the toothed rod which is associated with the third seat part and which moves together with the third seat part or it directly drives the third seat part.

As a result, all the seat parts are driven in synchronism. Two seat parts are moved with only one motor drive of the longitudinal adjustment. The first seat part moves relative to the second seat part and the third seat part additionally moves with respect to the first or the second seat part. In all, the seat part is divided into three or possibly even more seat parts. As a result, it becomes easier to bridge the gap and to adapt the cover fabric, e.g., to let it conform to the change.

It is preferred that the third seat part forms a seat front edge. In another preferred developed embodiment, the axis of the primary gear is connected to the second seat part, thus moving together therewith. In an alternative, the primary gear is framed on either side between toothed rack and toothed rod and is engaged. In this case, the gear follows half of the movement of the second seat part relative to the first one. This movement can be used to directly drive the third seat part or to provide a secondary gear having a desired tooth ratio with respect to the primary gear and meshes the toothed bar. In the last case, the third seat part can travel a longer distance than in the first case.

Other features and advantages of the invention will become more apparent upon reviewing the appended claims and the following non restrictive description of three embodiments of the invention, given by way of example only with reference to the drawing.

DETAILED DESCRIPTION OF THE INVENTION

Figure 1:
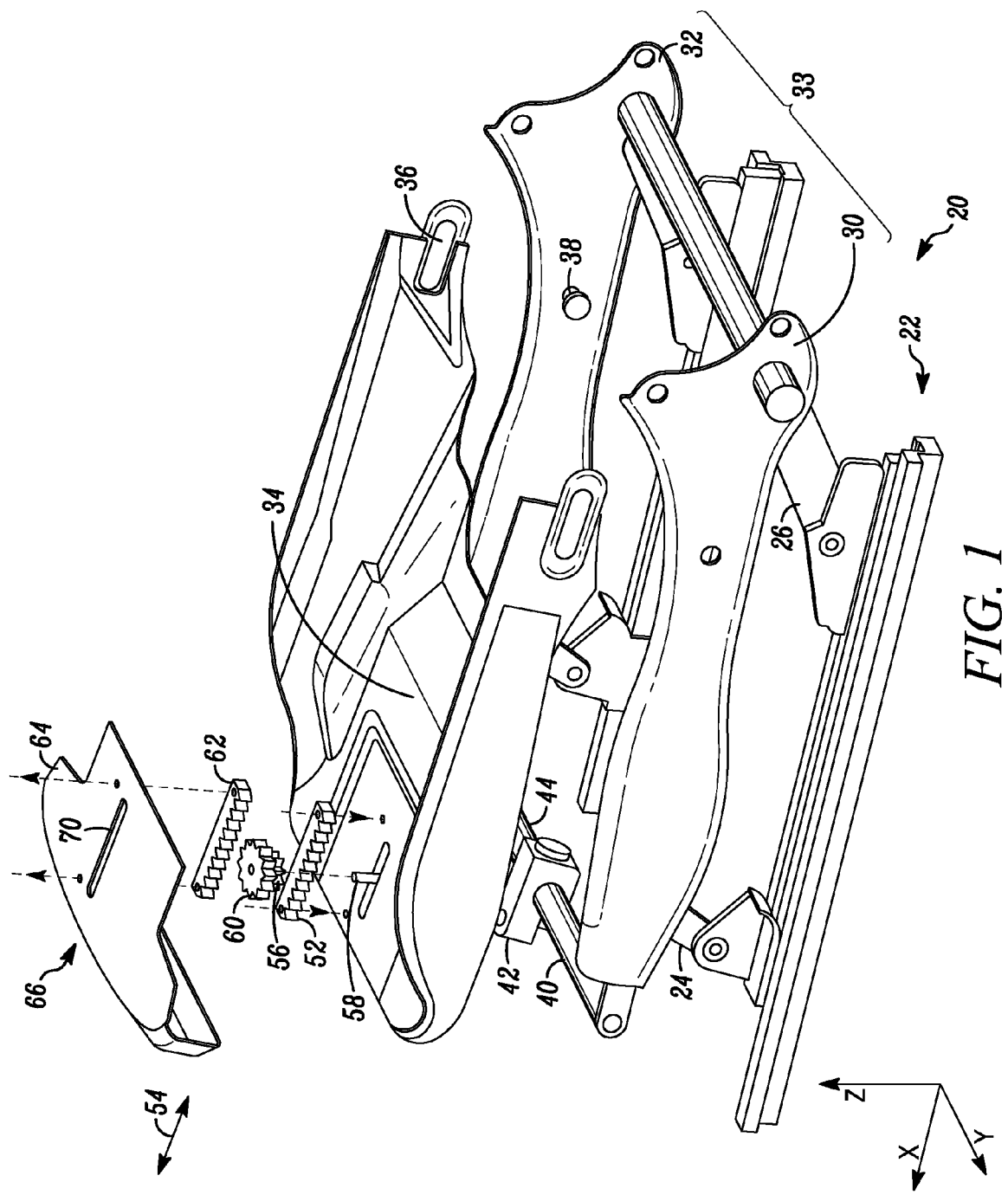
FIG. 1: shows a perspective illustration, in parts in the form of an assembly drawing, for a first exemplary embodiment.

Herein after, the first and the second exemplary embodiment according to the FIGS. 1 through 3 will be described first; these two exemplary embodiments are closely related. Then, the other embodiment will be discussed, in particular insofar as it is different from the other ones discussed previously.

As is known, the adjustable vehicle seat has an underframe 20. It comprises a longitudinal adjustment device 22 with two pairs of rails that are configured ac-cording to prior art and carry front rockers 24 as well as rear rockers 26. On the rockers 24, 26 there is retained a seat carrier that is substantially formed from a left side part 30 and from a right side part 32 which are hinge-linked to the rockers 24, 26. These two side parts 30, 32 form a first seat part 33.

There is further provided a cushion shell 34. It occupies about 40 to 70% of the seat part and forms cheeks at the sides. The cushion shell 34 forms the second seat part. In its rear region the first seat part 33 has long holes 36 through which holding devices 38 extend in the assembled condition, the holding devices being provided each on the side parts 30, 32. An articulated longitudinal guide is thus formed.

The two side parts 30, 32 are joined together by a front cross beam 40. A front end of a longitudinal adjustment device 44 is retained thereon in a housing 42. As can be seen from the FIGS. 2 and 3, this longitudinal adjustment device is con-figured to be a spindle drive; in this respect, the reader is referred to the applications WO 03/068551 A1, DE 103 53 245 A1, DE 1 755 740 A1, U.S. Pat. No. 6,260,922 B1, DE 10 2005 028 620 A1 and DE 198 15 283 C2. The longitudinal adjustment device 44 has a drive housing 46 that is retained in a holding device 48 which in turn is connected to the first seat part 33. In the drive housing, a spindle nut is rotatably carried in a known way that has not been illustrated herein though, the spindle nut forms a surrounding grip around a spindle 50. The axial position of this spindle 50 can be adjusted with respect to the drive housing 46 as this can be seen when comparing the FIGS. 2 and 3, where the two end positions are illustrated.

A toothed rack 52 is connected to the second seat part 34; it extends in a first seat direction 54, see arrow. This direction lies in the same x-z plane as a second seat direction which is defined by the longitudinal axis of the spindle 50, al-though it differs slightly, for example by 5 to 10 degrees. The angle with respect to the x-axis is greater with the first seat direction 54 than with the second seat direction.

A primary gear 56 engages the toothed rack 52. This primary gear 56 is rotatable about an axis line of an axis 58; this axis line extends in the x-z plane and is perpendicular to the first seat direction 54.

A secondary gear 60 is connected to the primary gear 56 so as to be driven jointly, in the embodiment shown, these two gears 56, 60 are made from one piece. The secondary gear 60 has a significantly larger diameter than the primary gear 56 so that a transmission of at least 1 to 1.5, preferably of at least 1 to 2, is achieved between the two of them. A toothed bar 62, which is parallel to the toothed rack 52, meshes the secondary gear 60. The two of them, meaning the toothed bar 62 and the toothed rack 52 can move relative to each other in the first seat direction 54.

Figure 2:
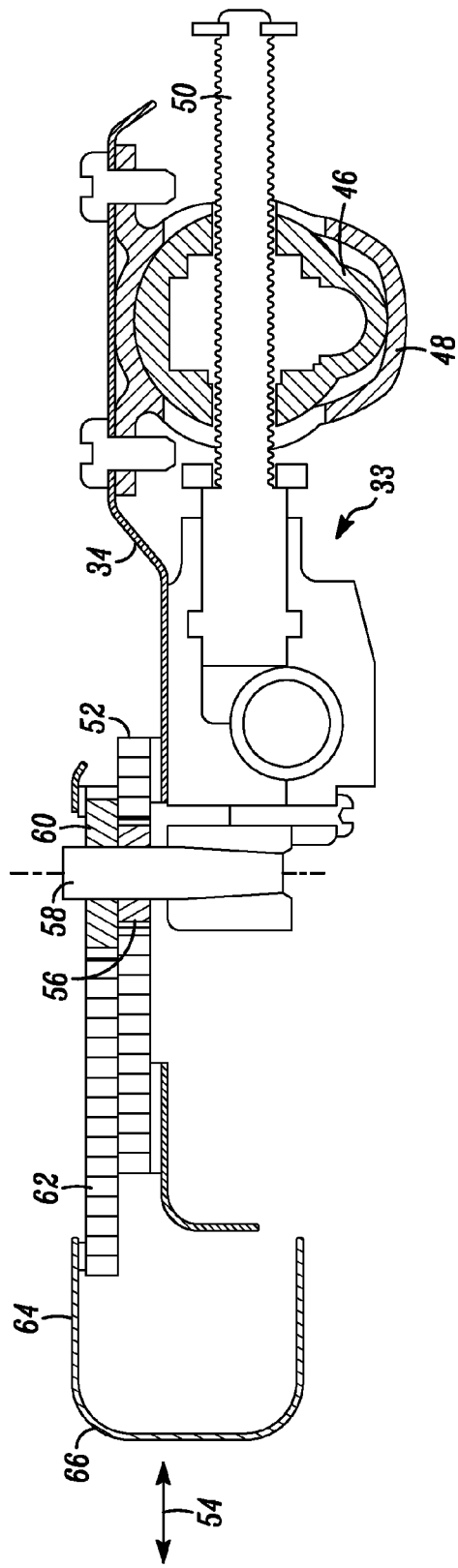
FIG. 2: shows a side view of a second exemplary embodiment that is built similar to the first exemplary embodiment shown in FIG. 1, a seat part being shown in its largest seat depth.
Figure 3:
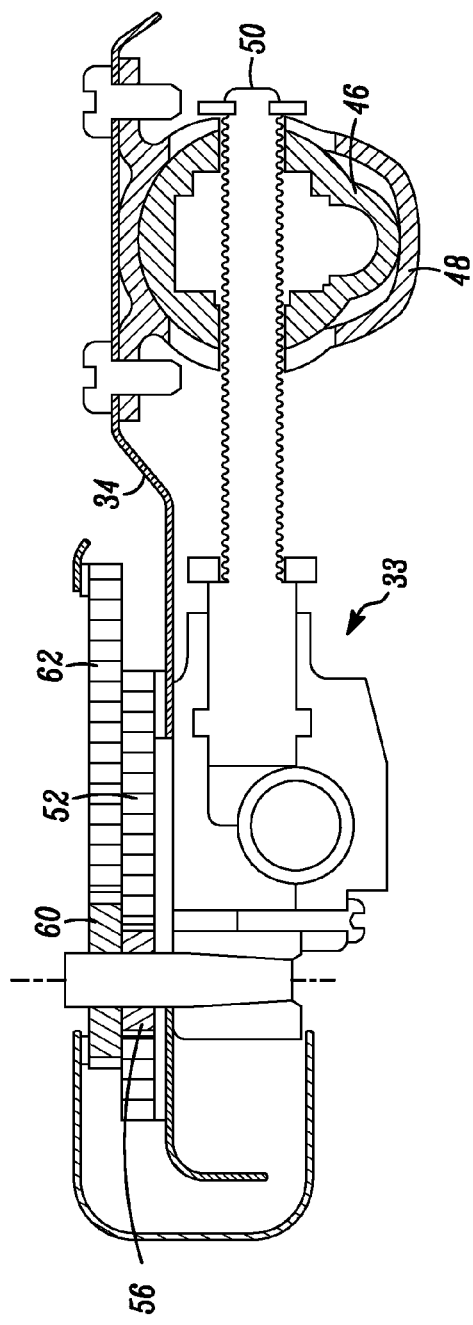
FIG. 3: shows a view like FIG. 3, but now in the position of least seat depth.

When the longitudinal adjustment device 44 is driven, starting from the position shown in FIG. 3, the toothed rack 52 is pushed forward and thereby caused to move relative to the primary gear 56. If one considers that the first seat part 33 is stationary, the axis 58 also remains stationary, the primary gear 56 remaining stationary as well as a result thereof. It is rotated by virtue of the movement of the second seat part. As a result, the secondary gear 60 is also rotated, which pushes the toothed bar 62 forward until the position shown in FIG. 2 is reached. By virtue of the transmission between the primary gear 56 and the secondary gear 60, the toothed bar 62 moves a considerably larger distance in the first seat direction 54 while the longitudinal adjustment device 44 performs its adjustment movement, in the second exemplary embodiment, it moves approximately double this distance. A third seat part 64 is connected to the toothed bar 62. This third seat part 64 forms a front edge 66 of the seat.

Figure 4:
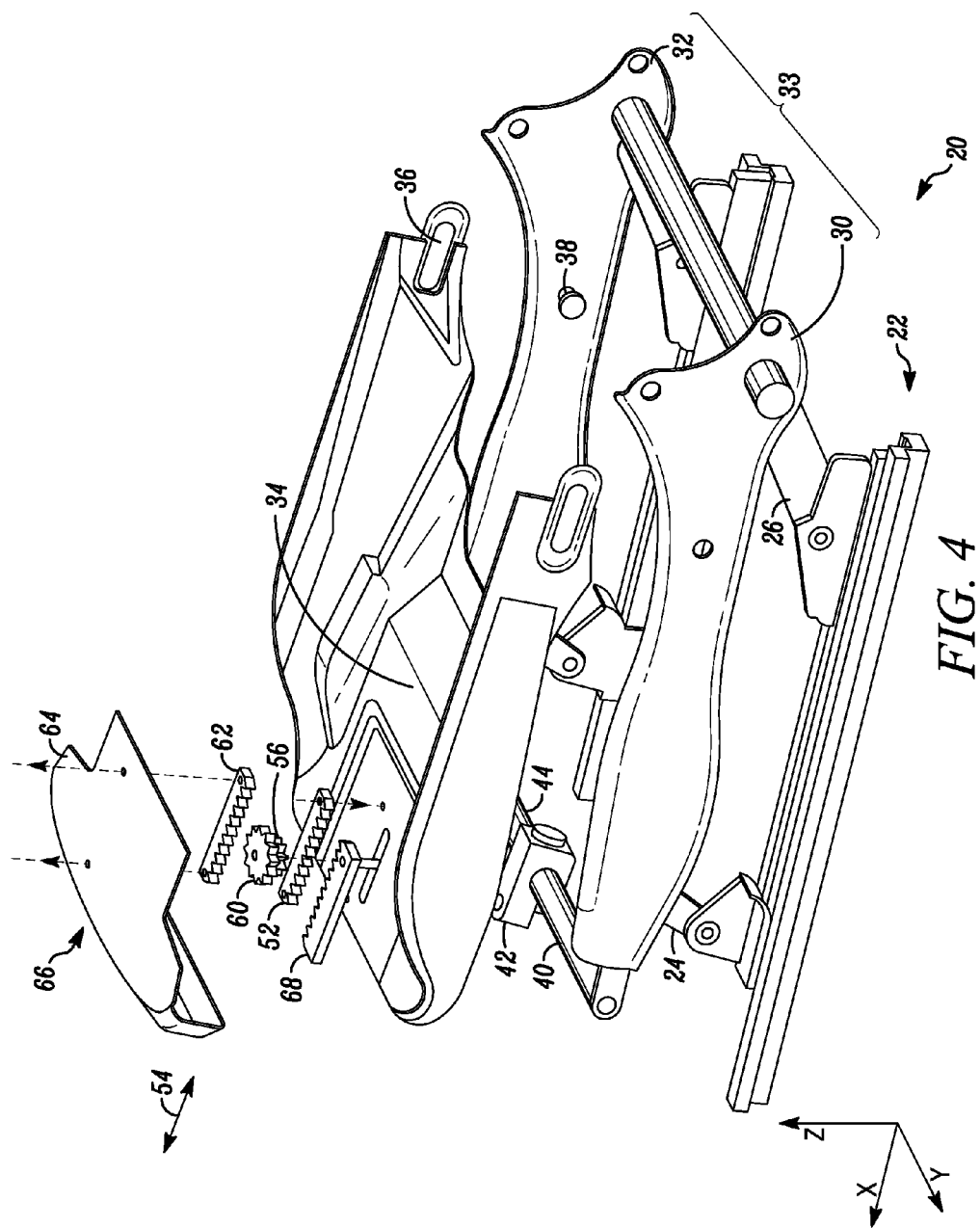
FIG. 4: shows a perspective illustration similar to FIG. 1 but now for a third exemplary embodiment.

The third exemplary embodiment shown in FIG. 4 differs from the first exemplary embodiment shown in FIG. 1 by the fact that the primary gear 56 is now not rotatable about an axis motion-linked to the first seat part. Instead, a toothed rod 68 is motion-linked to the first seat part, the toothed rod extending parallel to the toothed rack 52. Between the toothed rod 68 and the toothed rack 52 there is located the primary gear 56. In the discussed implementation, there is pro-vided, like in the first exemplary embodiment, a long hole that is formed in the second seat part 34. A pin, which is connected to the first seat part 33 at the bottom and to the toothed rod 60 at the top, engages this long hole. In FIG. 1, the axis 58 is provided instead of this pin.

Upon actuation of the longitudinal adjustment device 44, the toothed rod 66 and the toothed rack 52 are moved with respect to each other in the first seat direction 54. As a result, the primary gear 56 rotates. The secondary gear 60, which meshes the toothed bar 62 associated with the third seat part 64, rotates along therewith at the same angular velocity.

The unit consisting of the primary gear 56 and the secondary gear 60 moves both relative to the toothed rod 68 and to the toothed rack 52. There is provided a suited guide part such as a slide that is guided lengthwise by at least one of the toothed rack 52 or the toothed rod 68 or at another place in the first seat direction 54 and comprises an axis for the gear combination 56, 60.

Through appropriate choice of the ratio between the diameter of the primary gear 56 and the secondary gear 60, the desired gear transmission ratio or gear reduction can be achieved; it is also possible to equip both gears with the same diameter.

Between the discrete seat parts 33 and 34 as well as 34 and 64, there are pro-vided suited guides known in the art, which fix the displacement movements. The already mentioned long holes 36 and the associated holding devices 38 as well as the long hole mentioned in the second seat part 34 through which ex-tends the axis 58 or a pin, belong thereto. A long hole 36 extending in the first seat direction 54 in the third seat part 64, through which extends the axis 58, also belongs thereto, see FIG. 1.

Between the first seat part 33 and the second seat part 34, an actually known seat spring system (not shown) can be arranged, the seat spring system lengthening or shortening during adjustment movement between these two seat parts 33, 34.

Preferably, the toothed rack 52 is at least 30% shorter than the toothed bar 62. The toothed rack 52 and the toothed rod 68 are preferably built identically. The parts 52, 62, 68, 56 and 60 are preferably injection-molded parts, in particular made from plastic material. In a preferred embodiment, the second seat part 34 is moved forward about 32.5 mm with respect to the first seat part 33 and the third seat part is also moved forward about 32.5 mm relative to the second seat part 34 through the arrangement consisting of the toothed rack 52, the gears 56 and 60 and the toothed bar 62. Approximately one half of the padding extension is taken from the rear part, the other half from the front part. The longitudinal direction of the longitudinal adjustment device, meaning of the spindle 50 in particular, can differ from the actual direction of the displacement movement between the first seat part 33 and the second seat part 34 by approximately 10 degrees or also 20 degrees for example. These directions lie in the x-z plane.

What is claimed is:

1. A seat depth adjustable motor vehicle seat comprising: a first seat part, a second seat part and a longitudinal adjustment device interposed between the first seat part and the second seat part, the longitudinal adjustment device allowing for displacement movement in a first seat direction of the first seat part relative to the second seat part, wherein a toothed rack is provided, the toothed rack extends substantially in the first seat direction and is connected to the second seat part, a primary gear is provided and meshes with the toothed rack, a secondary gear is provided and rotates with the primary gear, a toothed bar is provided, the toothed bar extends substantially in a second seat direction and en-gages the secondary gear, and a third seat part is provided, the third seat part is slidably disposed in the second seat direction and is connected to the toothed bar.

2. The seat depth adjustable vehicle seat as set forth in claim 1, wherein the toothed rack has teeth, and an axis having an axis line extending in an x-z plane and transverse to the teeth is connected to the second seat part and the primary gear is disposed for rotation about an axis line of the axis.

3. The seat depth adjustable vehicle seat as set forth in claim 1, wherein a toothed rod is provided, is parallel to the first toothed rack and engages the primary gear.

4. The seat depth adjustable vehicle seat as set forth in claim 1, wherein the primary gear has a diameter that is at least 10% smaller than the secondary gear.

5. The seat depth adjustable vehicle seat as set forth in claim 1, wherein the primary gear and the secondary gear are rigidly joined together.

6. The seat depth adjustable vehicle seat as set forth in claim 1, wherein the first seat direction is substantially parallel to the second seat direction, and the first seat direction and the second seat direction extend in an x-z plane.

7. The seat depth adjustable vehicle seat as set forth in claim 1, wherein the longitudinal adjustment device comprises a spindle drive with a spindle and a drive housing.

8. The seat depth adjustable vehicle seat as set forth in claim 1, wherein the primary gear has a diameter that is at least 30% smaller than the secondary gear.

9. The seat depth adjustable vehicle seat as set forth in claim 1, wherein the primary gear and the secondary gear are made from one piece.

10. The seat depth adjustable vehicle seat as set forth in claim 1, wherein the first seat direction and the second seat direction extend in an x-z plane and the first seat direction is inclined at an angle to an x-axis that is at least 5 degrees greater than an angle between the x-axis and the second seat direction.

11. The seat depth adjustable vehicle seat as set forth in claim 1, wherein the first seat direction and the second seat direction extend in an x-z plane.

* * * * *